(12) United States Patent
Minamiguchi et al.

(10) Patent No.: US 10,407,091 B2
(45) Date of Patent: Sep. 10, 2019

(54) ELECTRIC POWER STEERING CONTROL APPARATUS

(71) Applicant: DENSO CORPORATION, Kariya, Aichi pref. (JP)

(72) Inventors: Yuuichi Minamiguchi, Kariya (JP); Motoaki Kataoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 122 days.

(21) Appl. No.: 15/569,626

(22) PCT Filed: Apr. 8, 2016

(86) PCT No.: PCT/JP2016/001955
§ 371 (c)(1),
(2) Date: Oct. 26, 2017

(87) PCT Pub. No.: WO2016/174829
PCT Pub. Date: Nov. 3, 2016

(65) Prior Publication Data
US 2018/0118253 A1 May 3, 2018

(30) Foreign Application Priority Data

Apr. 30, 2015 (JP) ................................ 2015-092976

(51) Int. Cl.
*B62D 5/00* (2006.01)
*B62D 5/04* (2006.01)
*B62D 6/10* (2006.01)

(52) U.S. Cl.
CPC ........... *B62D 5/0463* (2013.01); *B62D 5/049* (2013.01); *B62D 5/0472* (2013.01); *B62D 5/0484* (2013.01); *B62D 6/10* (2013.01)

(58) Field of Classification Search
USPC .................. 701/29.1, 29.7–31.3, 36, 41–44
See application file for complete search history.

(56) References Cited

U.S. PATENT DOCUMENTS 5,198,981 A * 3/1993 Collier-Hallman ......................... B62D 5/0463
180/446
5,473,539 A * 12/1995 Shimizu ............... B62D 5/0463
180/446

(Continued)

FOREIGN PATENT DOCUMENTS

JP  2004-276697 A  10/2004
JP  2012-045990 A  3/2012

(Continued)

*Primary Examiner* — Jonathan L Sample
(74) *Attorney, Agent, or Firm* — Knobbe, Martens, Olson & Bear, LLP

(57) ABSTRACT

An electric power steering control apparatus that assists a steering operation made by a driver with a motor includes: a target torque calculation unit calculating a target steering torque; an assist torque calculation unit calculating an assist torque which enables an actual steering torque follows close to the target steering torque according to a difference therebetween; a motor drive unit driving a motor acting on a steering system mechanism so that a steering angle of vehicle is changed according to the assist torque; and a followability change unit that detects an abnormality of a torque sensor for detecting the actual steering torque. When abnormality is detected in the torque sensor, a followability of the actual steering torque to the target steering torque controlled by the assist torque is degraded compared with a case where no abnormality is detected in the torque sensor.

7 Claims, 10 Drawing Sheets

(56) References Cited

U.S. PATENT DOCUMENTS

| | | | | |
|---|---|---|---|---|
| 6,152,254 | A * | 11/2000 | Phillips | B62D 5/0463 180/421 |
| 6,370,459 | B1 * | 4/2002 | Phillips | B62D 5/0436 180/443 |
| 7,918,306 | B2 * | 4/2011 | Tamaizumi | B62D 5/0466 180/443 |
| 2002/0124663 | A1 * | 9/2002 | Tokumoto | B62D 6/10 73/862.333 |
| 2003/0201136 | A1 * | 10/2003 | Ueno | B62D 5/008 180/443 |
| 2007/0114094 | A1 * | 5/2007 | Tamaizumi | B62D 5/0466 180/446 |
| 2007/0176577 | A1 * | 8/2007 | Kezobo | B62D 5/046 318/807 |
| 2009/0125189 | A1 * | 5/2009 | Matsumura | B62D 5/0466 701/42 |
| 2009/0281692 | A1 * | 11/2009 | Tamaizumi | B62D 5/0484 701/42 |
| 2010/0174442 | A1 * | 7/2010 | Nishimori | B62D 5/0472 701/31.4 |
| 2010/0222968 | A1 * | 9/2010 | Kifuku | B62D 5/0493 701/42 |
| 2011/0010051 | A1 * | 1/2011 | Ura | B62D 5/0487 701/41 |
| 2013/0049652 | A1 * | 2/2013 | Namikawa | H02P 6/08 318/400.02 |
| 2013/0060426 | A1 * | 3/2013 | Watanabe | B62D 5/0463 701/42 |
| 2013/0060427 | A1 * | 3/2013 | Kataoka | B62D 5/0466 701/42 |
| 2013/0238196 | A1 * | 9/2013 | Seto | B62D 5/0472 701/42 |
| 2013/0245893 | A1 * | 9/2013 | Sprinzl | B62D 5/0481 701/42 |
| 2014/0229065 | A1 * | 8/2014 | Dornhege | B62D 15/025 701/41 |
| 2014/0230533 | A1 * | 8/2014 | Greul | B62D 15/0225 73/117.02 |
| 2015/0298726 | A1 * | 10/2015 | Aoki | B62D 5/0463 701/43 |

FOREIGN PATENT DOCUMENTS

| | | |
|---|---|---|
| JP | 2012-254649 A | 12/2012 |
| JP | 2013-052793 A | 3/2013 |
| JP | 2014-024423 A | 2/2014 |
| JP | 2014-141173 A | 8/2014 |

* cited by examiner

ELECTRIC POWER STEERING CONTROL APPARATUS

CROSS REFERENCE TO RELATED APPLICATION

This application is based on Japanese Patent Application No. 2015-092976 filed on Apr. 30, 2015, the disclosure of which is incorporated herein by reference.

TECHNICAL FIELD

The present disclosure relates to an electric power steering control apparatus that assists, using a motor, a steering operation made by a driver.

BACKGROUND ART

As the electric power steering control apparatus described above, a device, which calculates a basic control variable based on a detection result of a torque sensor for detecting a steering torque and estimates the steering torque with a configuration that does not use the torque sensor when the torque sensor is abnormal (refer to, for example, Patent Literature 1), has been known. In this kind of electric power steering control apparatus, when the torque sensor has malfunctions, the basic control variable is calculated based on the steering torque estimated based on another signal. However, if a detection cycle of the acquirable estimated steering torque is longer than a detection cycle of the torque sensor, a torque oscillation increases due to a decrease in the detection cycle (a longer detection cycle). To cope with such a problem, Patent Literature 1 stabilizes a control system by subtracting a damping torque set based on a steering angle from the basic control variable.

PRIOR ART LITERATURE

Patent Literature

Patent Literature 1: JP 2014-141173 A

SUMMARY OF INVENTION

In the above-described electric power steering control apparatus, when the detection cycle of the steering torque acquired during the malfunctions of the torque sensor decreases greatly, the vibration cannot be sufficiently suppressed with only the damping torque that is set based on a steering angular velocity. In some cases, the control system may become unstable.

The present disclosure has been made in view of the above difficulties, and an object of the present disclosure is to provide an electric power steering control apparatus that assists a steering operation made by a driver using a motor and is capable of stabilizing a control system when a torque sensor has malfunctions.

According to an aspect of the present disclosure, an electric power steering control apparatus, which assists a steering operation made by a driver with a motor, includes: a target torque calculation unit configured to calculate a target steering torque; an assist torque calculation unit configured to calculate an assist torque which enables an actual steering torque to follow close to the target steering torque, according to a difference between the target steering torque and the actual steering torque; a motor drive unit configured to drive a motor which acts on a steering system mechanism so that the steering system mechanism changes a steering angle of a vehicle according to the assist torque; and a followability change unit configured to detect an abnormality of a torque sensor that detects the actual steering torque. When an abnormality is detected in the torque sensor, the followability change unit degrades a followability of the actual steering torque to the target steering torque controlled by the assist torque calculated in the assist torque calculation unit, compared with a case where no abnormality is detected in the torque sensor.

According to the electric power steering control apparatus described above, even when the detection cycle or the detection accuracy of the steering torque decreases in an abnormal state of the torque sensor as compared with a normal state, the followability of the steering torque to the target torque is degraded in order to reduce the vibration and stably operate the control system.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, preferred embodiments of the present disclosure will be described with reference to the accompanying drawings.

First Embodiment

Figure 1:
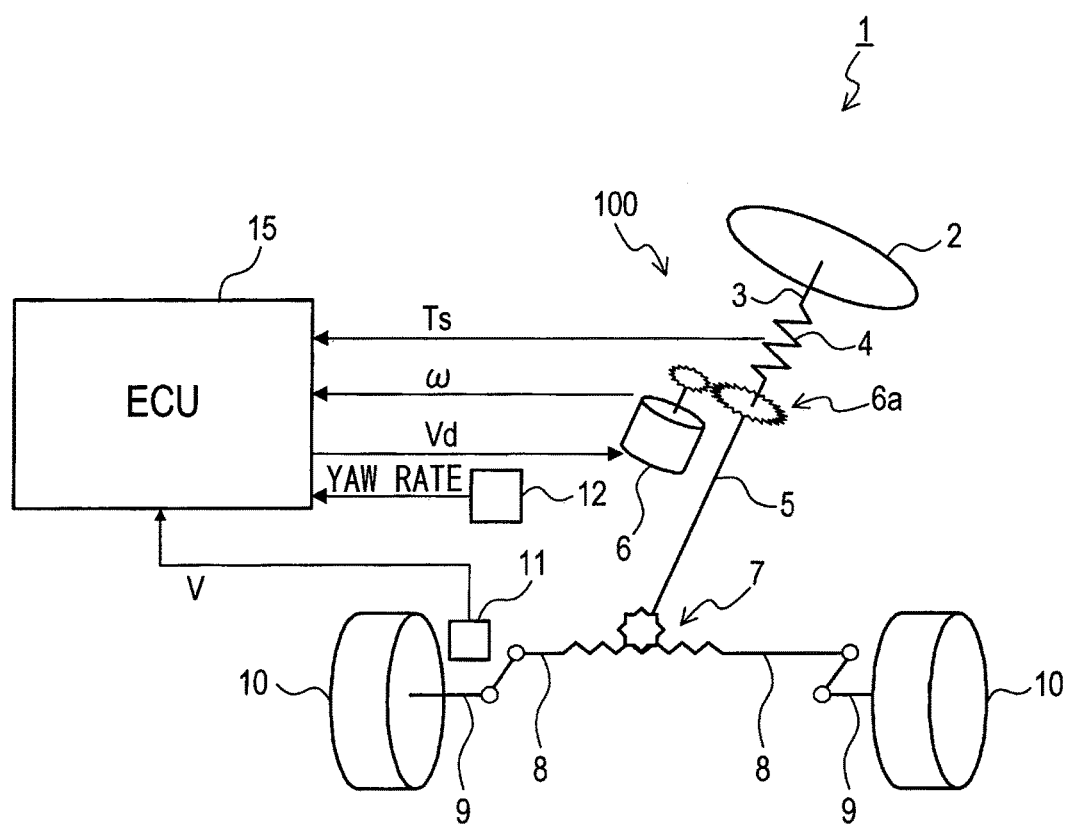
FIG. 1 is a configuration diagram illustrating a schematic configuration of an electric power steering control apparatus according to an embodiment of the present disclosure.

As illustrated in FIG. 1, an electric power steering control apparatus 1 according to the present embodiment is equipped to a vehicle such as a passenger car, and assists driver's operation of a steering wheel 2 with a motor 6. The steering wheel 2 is fixed to one end of a steering shaft 3, the other end of the steering shaft 3 is connected with a torque sensor 4, and the other end of the torque sensor 4 is connected with an intermediate shaft 5. In the following description, an entire shaft body extending from the steering shaft 3 to the intermediate shaft 5 through the torque sensor 4 is collectively referred to as "steering shaft".

The torque sensor 4 is a sensor for detecting a steering torque Ts. Specifically, the torque sensor 4 includes a torsion bar that couples the steering shaft 3 with the intermediate shaft 5, and detects a torque applied to the torsion bar on the basis of a torsion angle of the torsion bar.

The motor 6 assists a steering force of the steering wheel 2, and a rotation of the motor 6 is transmitted to the intermediate shaft 5 through a speed reduction mechanism 6a. Specifically, the speed reduction mechanism 6a includes a worm gear provided on a distal end of a rotation shaft of the motor 6, and a worm wheel coaxially disposed in the intermediate shaft 5 in a state to be meshed with the worm gear. With the above configuration, the rotation of the motor 6 is transmitted to the intermediate shaft 5. Conversely, when the intermediate shaft 5 is rotated by the operation of the steering wheel 2 or a reaction force (road surface reaction force) from a road surface, the rotation of the intermediate shaft 5 is transmitted to the motor 6 through the speed reduction mechanism 6a, and the motor 6 is also rotated.

The motor 6 is configured, for example, as a brushless motor, and internally includes a rotation sensor such as a resolver so as to output a rotation state of the motor 6. The motor 6 according to the present embodiment can output at least a motor speed ω (information indicative of a rotation angular velocity) as the rotation state from the rotation sensor.

The other end of the intermediate shaft 5 having one end connected with the torque sensor 4 on an opposite side is connected to a steering gear box 7. The steering gear box 7 is configured by a gear mechanism having a rack and a pinion gear, and teeth of the rack are meshed with the pinion gear disposed on the other end of the intermediate shaft 5. For that reason, when the driver rotates the steering wheel 2, the intermediate shaft 5 is rotated (that is, the pinion gear is rotated), to thereby move the rack horizontally. Respective tie rods 8 are fitted to both ends of the rack, and the tie rods 8 reciprocate horizontally together with the rack. As a result, the tie rods 8 push or pull respective knuckle arms 9 at tips of the tie rods 8, to thereby change an orientation of respective tires 10 which are steered wheels.

With the above configuration, when the driver rotates (steers) the steering wheel 2, the rotation of the steering wheel 2 is transmitted to the steering gear box 7 through the steering shaft 3, the torque sensor 4, and the intermediate shaft 5. The rotation of the intermediate shaft 5 is converted into a horizontal movement of the tie rods 8 within the steering gear box 7, and both of the right and left tires 10 are steered with the movement of the tie rods 8.

An electric control unit (ECU) 15 operates with an electric power from a vehicle-mounted battery not shown. The ECU 15 calculates an assist torque command Ta on the basis of a steering torque Ts detected by the torque sensor 4, a motor speed ω of the motor 6, and the vehicle speed V detected by the vehicle speed sensor 11. The ECU 15 applies a drive voltage Vd corresponding to a calculation result to the motor 6, to thereby control the amount of assist of a driver's force for rotating the steering wheel 2 (further a force for steering both of the tires 10).

In the present embodiment, because the motor 6 is a brushless motor, the drive voltage Vd output (applied) from the ECU 15 to the motor 6 includes drive voltages Vdu, Vdv, and Vdw of three phases (U, V, W) in detail. The drive voltages Vdu, Vdv, and Vdw for those phases are applied (drive currents for the respective phases are supplied) from the ECU 15 to the motor 6, to thereby control the rotation of the motor 6. A method of driving (for example, PWM driving) the brushless motor with the drive voltages of three phases, and a driver circuit (for example, three-phase bipolar driver circuit) for generating the drive voltages of three phases have been well known, and therefore detailed description will be omitted.

The ECU 15 directly controls the drive voltage Vd to be applied to the motor 6, to thereby control the motor 6. With the control of the motor 6, the ECU 15 resultantly controls a steering system mechanism 100 driven by the motor 6. Hence, a control target of the ECU 15 is the steering system mechanism 100. The steering system mechanism 100 is an overall mechanism except for the ECU 15 in the system configuration diagram illustrated in FIG. 1. That is, the steering system mechanism 100 extends from the steering wheel 2 to the respective tires 10 through which the steering force of the steering wheel 2 is transmitted.

Next, a schematic configuration (control mechanism) of the ECU 15 will be described with reference to a block diagram of FIG. 2. In the control mechanism of the ECU 15 illustrated in FIG. 2, the respective units except for a current feedback (FB) unit 42, and a part of functions of the current FB unit 42 are actually realized by allowing an unillustrated CPU provided in the ECU 15 to execute a predetermined control program. In other words, various functions realized by the CPU are divided into the respective functional blocks shown in FIG. 2. As an example, the control mechanism illustrated in those respective diagrams is realized by software program, and it is needless to say that all or a part of the control mechanism illustrated in FIG. 2 and so on may be realized by hardware circuit, such as a logic circuit.

Figure 2:
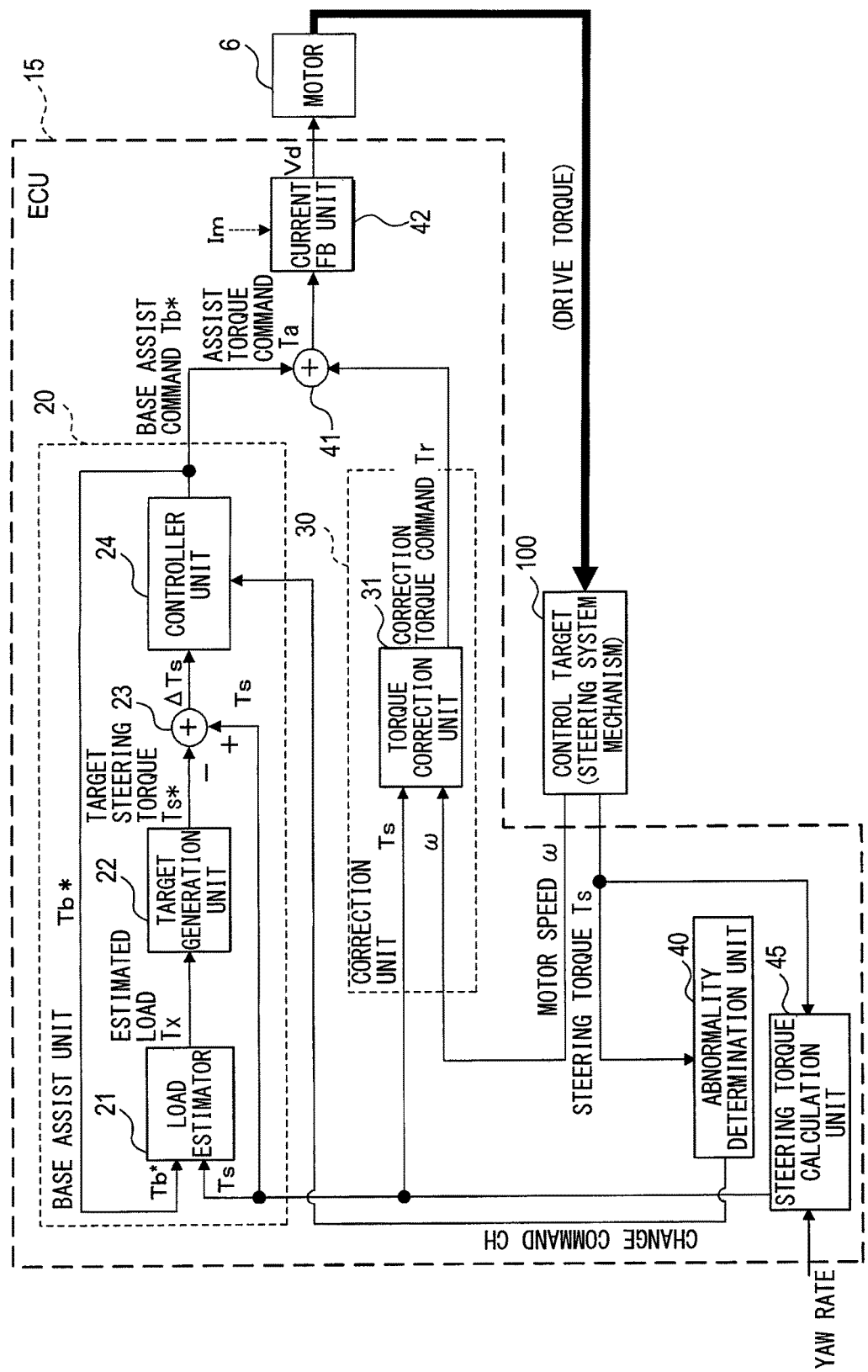
FIG. 2 is a configuration diagram illustrating a schematic configuration of a control mechanism of an ECU.

As illustrated in FIG. 2, the ECU 15 includes a base assist unit 20, a correction unit 30, an adder 41, a current FB unit 42, an abnormality determination unit 40, and a steering torque calculation unit 45. The base assist unit 20 generates a base assist command Tb*. The base assist unit 20 is configured as a block to realize the characteristic of a steering reaction force (steering torque) corresponding to a road surface reaction force (road surface load), that is, realizing that the reaction (reaction force) corresponding to the road surface load is transmitted quasi-steadily to the driver, to thereby make it easier for the driver to grasp a state of the vehicle and a state of the road surface.

The base assist unit 20 includes a load estimator 21, a target generation unit 22, a deviation calculator 23, and a controller unit 24. The base assist unit 20 generates the base assist command Tb* for assisting the operation of the steering wheel 2 based on the steering torque Ts so that the steering torque Ts changes according to the road surface load applied to each tire 10 from the road surface.

The load estimator 21 estimates the road surface load based on the base assist command Tb* and the steering torque Ts. The target generation unit 22 generates a target steering torque Ts* which is a target value of the steering torque, based on the road surface load (estimated load Tx) estimated by the load estimator 21. The deviation calculator 23 calculates a torque deviation ΔTs that is a difference between the steering torque Ts and the target steering torque Ts*. The controller unit 24 generates the base assist command Tb* indicative of the assist steering force so that the torque deviation ΔTs reduces to zero, on the basis of the torque deviation ΔTs, that is, for generating the assist steering force (also referred to as assist torque or assist amount) corresponding to the road surface load.

Since the base assist command Tb* generated in this manner is a torque command for generating the assist steering force corresponding to the road surface load, the characteristic of the steering reaction force corresponding to at least the road surface load can be realized even by merely inputting the base assist command Tb* to the current FB unit 42.

The correction unit 30 generates a correction torque command Tr. The correction unit 30 is a block for realizing operation stability (vehicle movement characteristic) of the whole vehicle. In other words, the correction unit 30 is a block for reducing an unstable behavior (vibrating behavior or the like) transmitted to the steering wheel due to unstable behavior of the vehicle so that the behavior (behavior during steering the respective tires 10) of the vehicle becomes a desired behavior characteristic (specifically, the vehicle behavior converges appropriately). The correction unit 30 includes a torque correction unit 31. The torque correction unit 31 generates a correction torque command Tr for reducing (converging) the unstable behavior described above based on the steering torque Ts and the motor speed ω.

The adder 41 adds the base assist command Tb* to the correction torque command Tr to generate the assist torque command Ta. In other words, the assist torque command Ta is generated, by the adder 41, by adding the base assist command Tb* generated by the base assist unit 20 to the correction torque command Tr generated by the correction unit 30.

The current FB unit 42 applies, in order to drive the motor 6, the drive voltage Vd to the motor 6 based on the assist torque command Ta. The current FB unit 42 applies the drive voltage Vd to the motor 6 so that a torque (assist steering force) corresponding to the assist torque command Ta is applied to the steering shaft (particularly, the tires 10 side of the torque sensor 4). Specifically, the current FB unit 42 sets a target current (target current for each phase) to be supplied to each phase of the motor 6 on the basis of the assist torque command Ta. The current FB unit 42 detects and feeds back a supply current value Im of each phase, and controls the drive voltage Vd (controls the supply current) so that a detection value (supply current Im of each phase) of the supplied current Im matches a target current, to thereby generate a desired assist steering force for the steering shaft.

The abnormality determination unit 40 detects an abnormality of the torque sensor 4 by monitoring a signal output from the torque sensor 4. For example, when a signal cannot be obtained from the torque sensor 4 within a preset reference duration, or when the signal value does not change, or the like, the abnormality determination unit 40 determines that there is an abnormality in the torque sensor 4.

When there is no abnormality in the torque sensor 4, the steering torque Ts detected by the torque sensor 4 is input to the controller unit 24.

Figure 3:
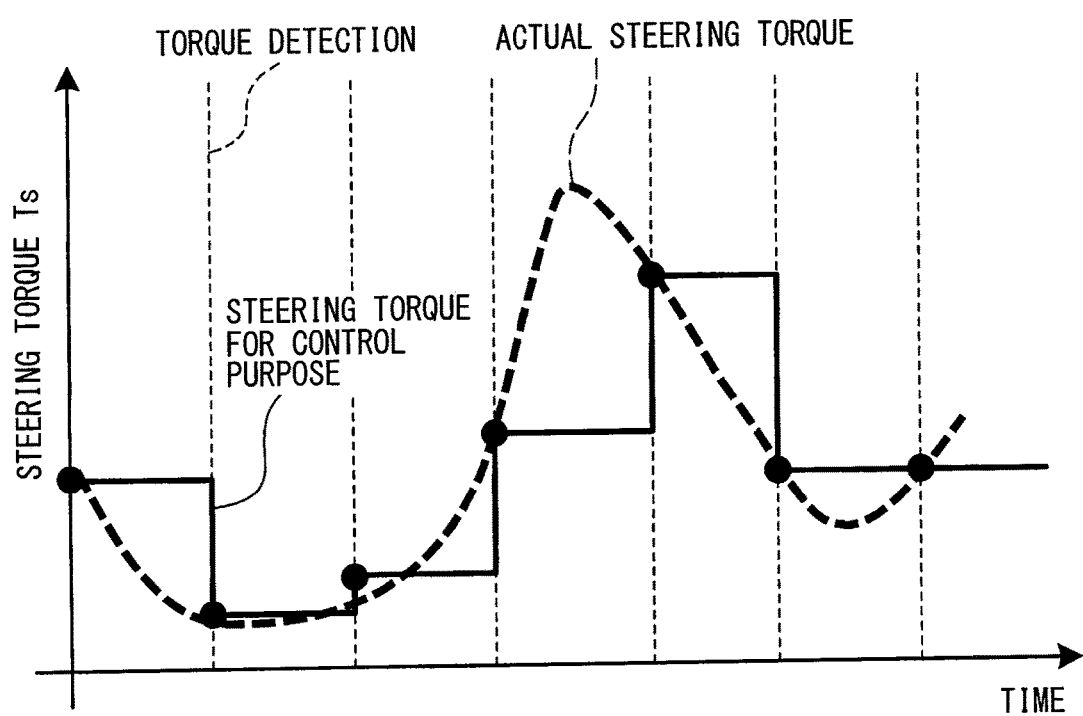
FIG. 3 is a graph illustrating a difference between an actual steering torque and a sampled steering torque.

In this example, when it is determined that there is an abnormality in the torque sensor, in the case of a configuration in which multiple systems of torque sensors are mounted, the steering torque calculation unit 45 detects the steering torque with the use of a signal of the torque sensor in which no abnormality occurs. In this configuration, as illustrated in FIG. 3, since it takes time to monitor the torque sensor in which the abnormality occurs, a detection cycle (sampling cycle) of the steering torque may be longer than a detection period in a normal state. On the other hand, in a configuration where only one torque sensor is mounted, the steering torque calculation unit 45 estimates the steering torque from a yaw rate signal that is another signal from the yaw rate sensor 12 or the like. In this configuration, with the use of a signal that has a longer cycle than the sampling cycle of the torque sensor, the detection cycle (sampling cycle) of the steering torque becomes long as compared with the detection cycle in the normal state as in the previous example. When the detection cycle of the steering torque becomes longer, the longer detection cycle affects the assist torque calculated based on the steering torque. As a result, the vibration of the control system increases as compared with the normal state. Further, when the detection cycle of the torque drops greatly, the control system becomes unstable, which may adversely affect the electric power steering.

For that reason, in the case where the abnormality of the torque sensor 4 is detected, the abnormality determination unit 40 outputs a change command CH which instructs a decrease of followability compared with a case where the abnormality of the torque sensor 4 is not detected. Herein, the followability is a parameter indicating how close the steering torque controlled by the controller unit 24 is close to the target torque. Specifically, when the sampling cycle of the steering torque Ts becomes longer, the control system tends to become unstable. In this case, the followability of the steering torque to the target torque is decreased in order to prevent the unstable state of the control system.

Figure 4:
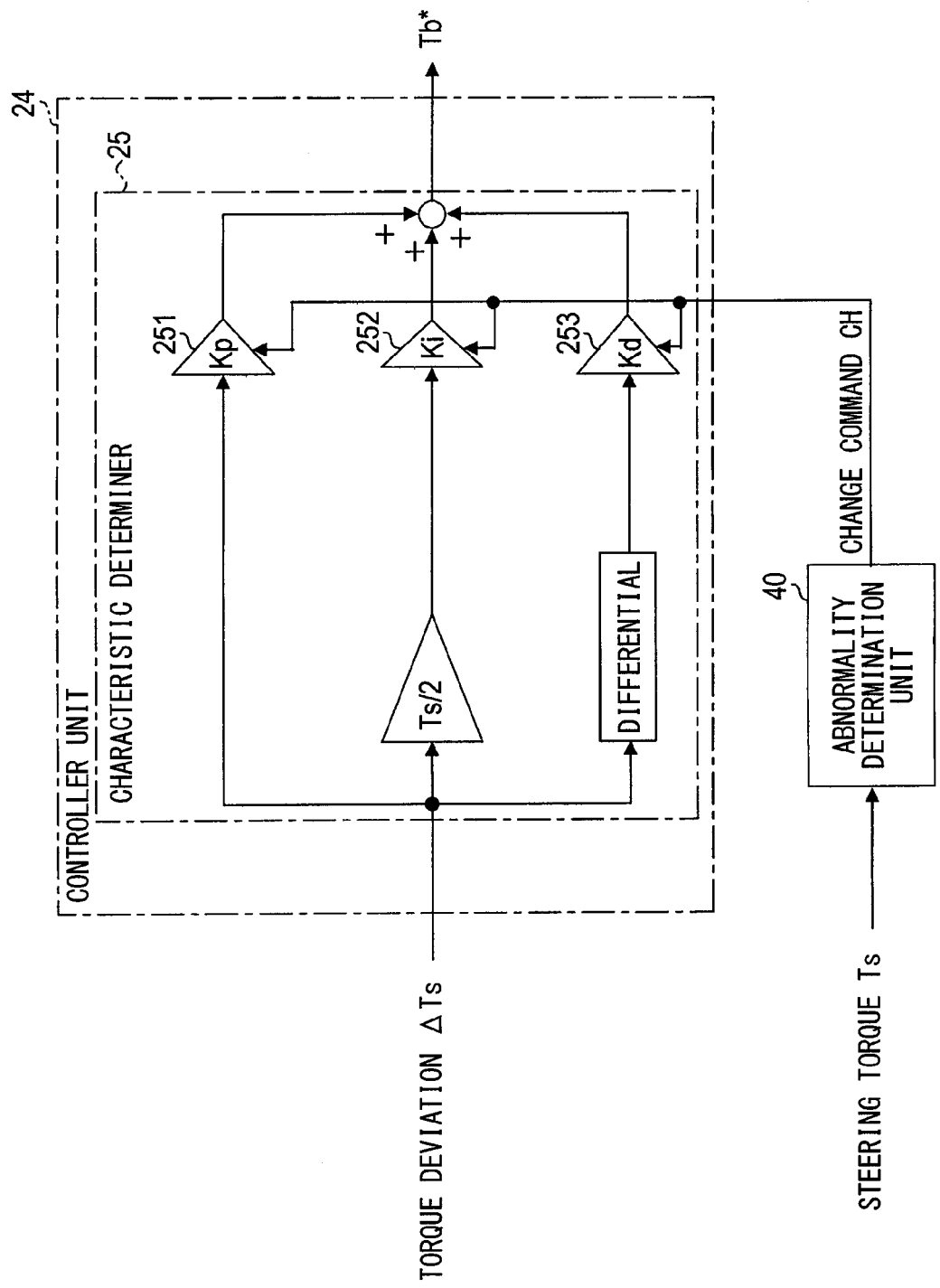
FIG. 4 is a configuration diagram illustrating a schematic configuration of a controller unit according to a first embodiment of the present disclosure.

In detail, as illustrated in FIG. 4, the controller unit 24 includes a characteristic determiner 25. The characteristic determiner 25 gives a PID gain to the torque deviation ΔTs to determine the control characteristic. It should be noted that the characteristic determiner 25 is a known technique that bilinearly converts a mathematical expression expressing a general proportional integral differential (PID) control for discretization, and realizes a control structure based on a mathematical expression obtained by the conversion.

Further, the characteristic determiner 25 includes a proportional gain assigner 251, an integral gain assigner 252, and a differential gain assigner 253. The proportional gain assigner 251 assigns a gain Kp to a proportional value component proportional to the deviation ΔTs.

Further, the integral gain assigner 252 assigns a gain Ki to an integral value component used for the integration of the deviation ΔTs. Further, the differential gain assigner 253 assigns a gain Kd to a differential value component obtained by differentiating the deviation ΔTs.

Figure 5:
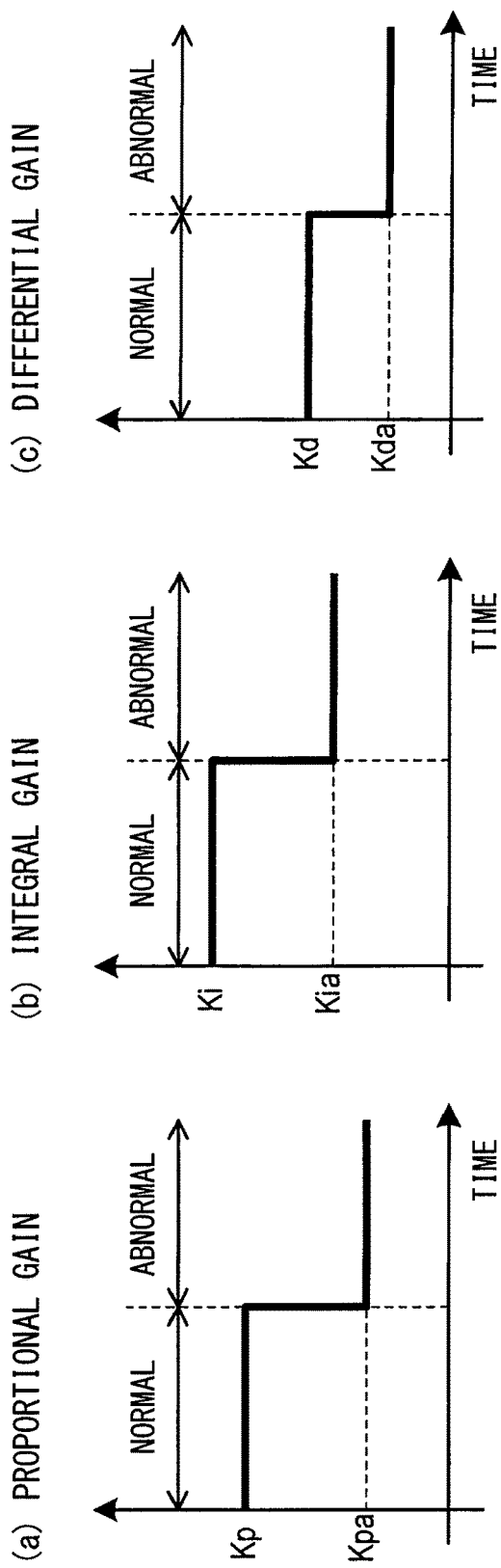
FIG. 5 is a graph illustrating a modification example of a control gain in the first embodiment.

The gains of the gain assigners 251 to 253 are set according to the change command CH from the abnormality determination unit 40. Specifically, as illustrated in (a) of FIG. 5, for example, a proportional gain Kpa set when the torque sensor 4 is abnormal is set to have a smaller value than the proportional gain Kp set when the torque sensor 4 is normal. Similarly, an integral gain Kia illustrated in (b) of FIG. 5 and a differential gain Kda illustrated in (c) of FIG. 5, both of which are set when the torque sensor 4 is abnormal, are set to have smaller values than the integral gain Ki and the differential gain Kd which are set when the torque sensor 4 is normal.

Meanwhile, the followability (responsiveness) of the steering torque to the target torque improves with an increase of the gains assigned by the gain assigners 251 to 323, and the followability degrades with a decrease of the gains. In other words, when the abnormality of the torque sensor 4 is detected, the followability is lowered.

In the electric power steering control apparatus 1, the load estimator 21 and the target generation unit 22 calculate the target torque based on the steering torque, which is a torque in an axial direction and is applied to the steering shaft rotating during a steering operation made to the vehicle.

Further, the controller unit 24 calculates the assist torque for controlling the steering torque close to the target torque according to the deviation between the target torque and the steering torque. Further, the current FB unit 42 drives the motor 6, which acts on the control target 100 according to the assist torque. Herein, the control target 100 changes the steering angle of the vehicle. Further, the abnormality determination unit 40 detects the abnormality of the torque sensor 4 that detects the steering torque.

In the case where the abnormality of the torque sensor 4 is detected, the abnormality determination unit 40 degrades the followability of the steering torque to the target torque which is controlled by the controller unit 24, compared with the followability when the abnormality of the torque sensor 4 is not detected.

According to the electric power steering control apparatus 1 as described above, when the torque sensor 4 has malfunctions, even if the detection cycle of the steering torque decreases, the steering operation can be appropriately assisted. In particular, when the torque sensor 4 is abnormal, the followability of the steering torque to the target torque is lowered in the calculation of the assist torque. As a result, even if the detection cycle of the steering torque decreases, the vibration can be restricted, and the control system can be stably operated.

Figure 6:
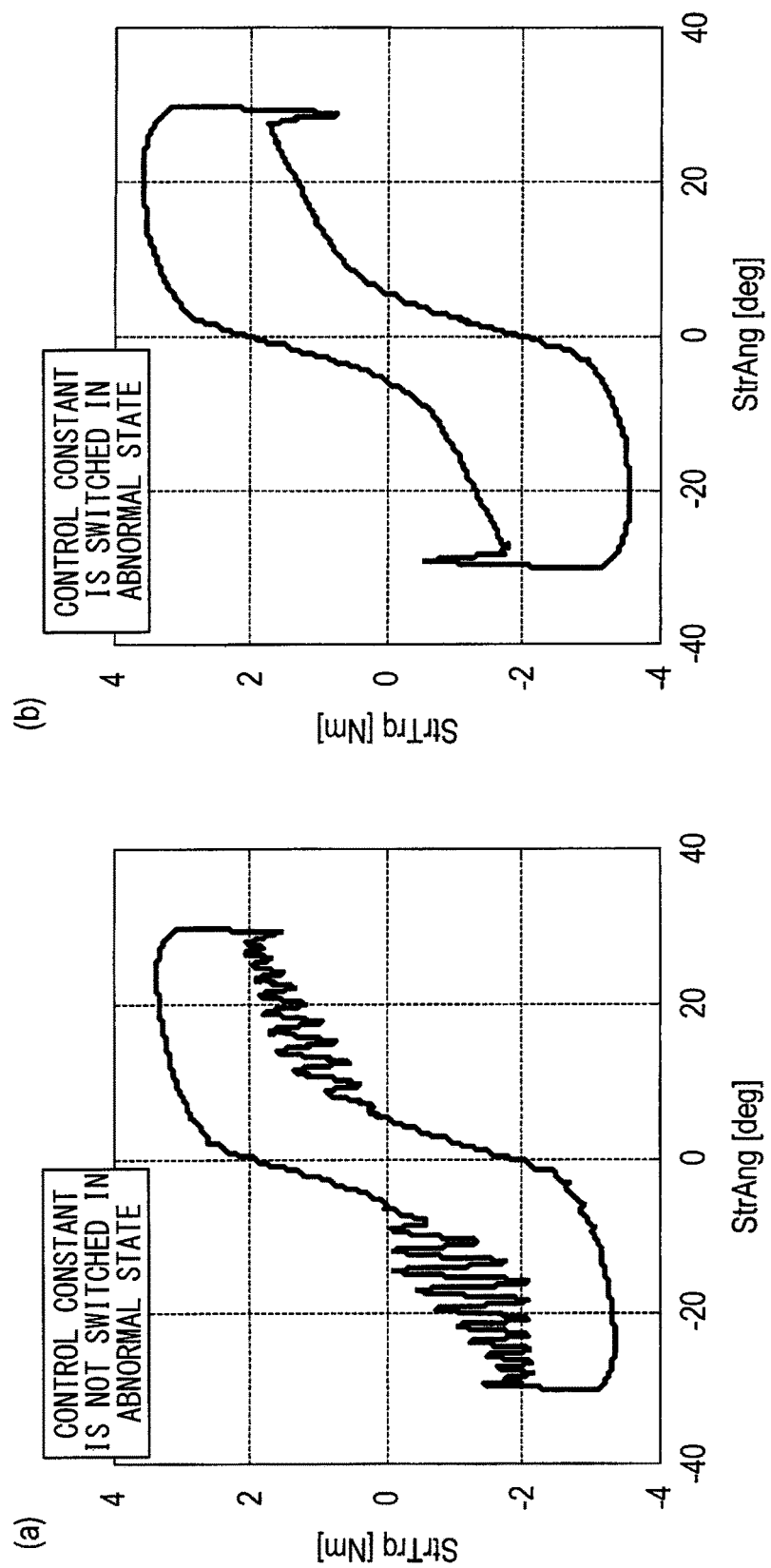
FIG. 6 is a graph illustrating the effects of the present disclosure.

For example, in the case where the followability is not changed even when the torque sensor 4 is abnormal, as illustrated in (a) of FIG. 6, the steering torque (StrTrq) changes so as to oscillate with a change in the steering angle (StrAng). On the other hand, in the configuration of the present embodiment, as illustrated in (b) of FIG. 6, it can be seen that the steering torque (StrTrq) smoothly changes without oscillating with a change in the steering angle (StrAng).

In addition, in the electric power steering control apparatus 1 described above, when the abnormality of the torque sensor 4 is detected, the abnormality determination unit 40 changes the control gain used by the controller unit 24 in calculation of the assist torque, to thereby degrade the followability.

According to the electric power steering control apparatus 1 described above, the control system can be stably operated with a simple configuration for changing the control gain.

Further, the configuration for changing the control gain in the electric power steering control apparatus 1 is configured as a PID controller.

According to the electric power steering control apparatus 1 described above, since the controller is configured as the PID controller, the control gain can be easily changed.

Second Embodiment

Next, an electric power steering control apparatus according to another configuration will be described. In the present embodiment (a second embodiment), only portions different from those in the electric power steering control apparatus 1 according to the first embodiment will be described in detail, and the same portions as those of the electric power steering control apparatus 1 according to the first embodiment are denoted by identical symbols, and a description of those portions will be omitted.

Figure 7:
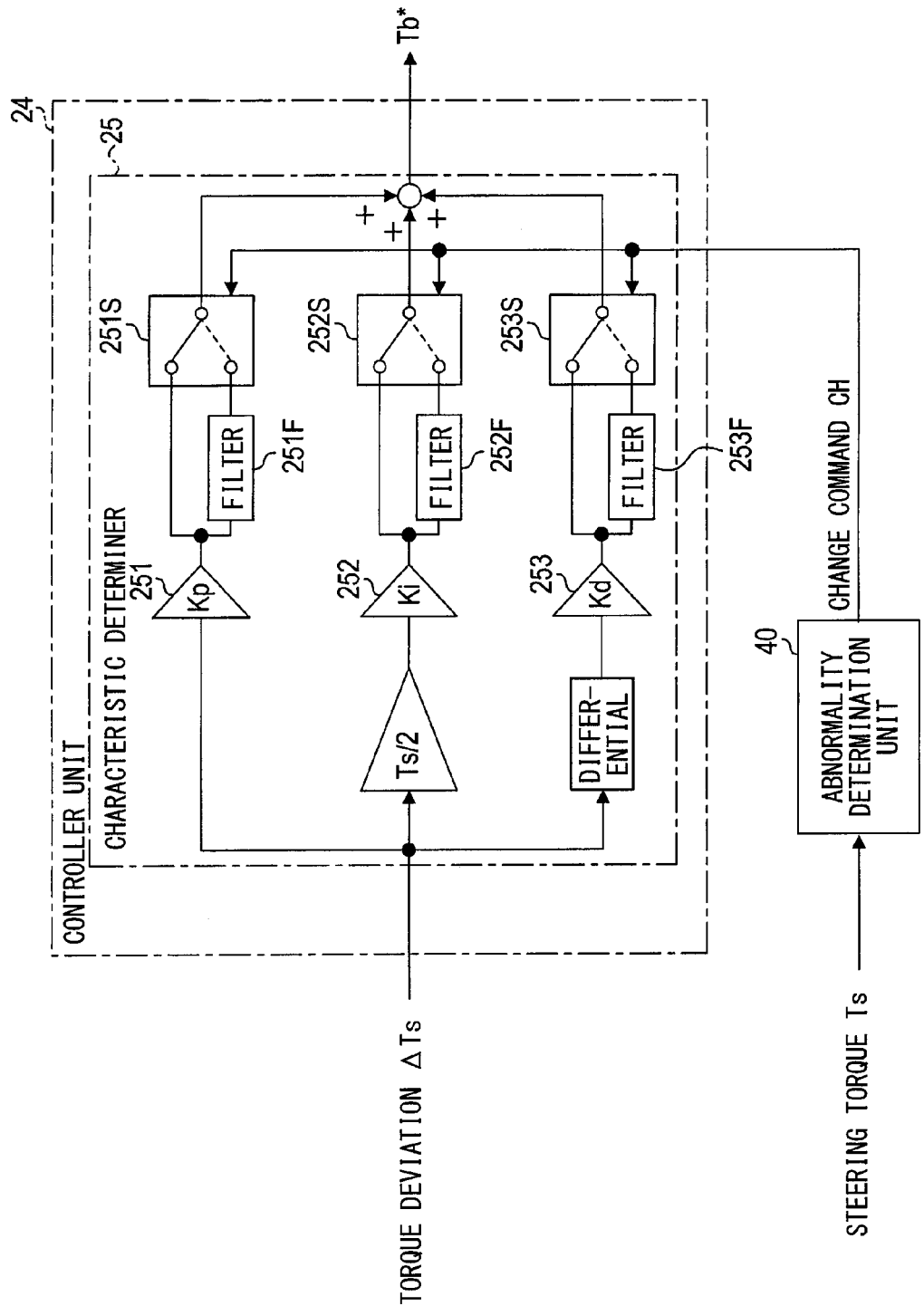
FIG. 7 is a configuration diagram illustrating a schematic configuration of a controller unit according to a second embodiment of the present disclosure.

In the electric power steering control apparatus according to the present embodiment, when the abnormality of a torque sensor 4 is detected, the characteristic of a controller is changed with the use of filters 251F, 252F, and 253F. In more detail, as illustrated in FIG. 7, a characteristic determiner 25 in a controller unit 24 includes the filters 251F, 252F, 253F and switches 251S, 252S, 253S.

A wiring on an output side of a proportional gain assigner 251 is branched into two systems. One system is connected directly to one terminal of the switch 251S, and the other system is connected to the other terminal of the switch 251S through the filter 251F.

Likewise, the filter 252F and the switch 252S are disposed on an output side of the integral gain assigner 252, and the filter 253F and the switch 253S are disposed on the output side of the differential gain assigner 253.

The abnormality determination unit 40 transmits the change command CH to the respective switches 251S, 252S, and 253S according to whether the torque sensor 4 is abnormal or not, to thereby switch contact points of the respective switches 251S, 252S, and 253S. In other words, when the abnormality of the torque sensor 4 is not detected, contact points of the respective switches 251S, 252S, and 253S are connected to the sides where the filters 251F, 252F, and 253F do not exist so that the output is transmitted from the respective assigners 251, 252, and 253 without passing through the respective filters 251F, 252F, and 253F. When the abnormality of the torque sensor 4 is detected, contact points of the respective switches 251S, 252S, and 253S are connected to the sides where where the filters 251F, 252F, and 253F exist so that the output is transmitted from the respective gain assigners 251, 252, and 253 through the respective filters.

Figure 8:
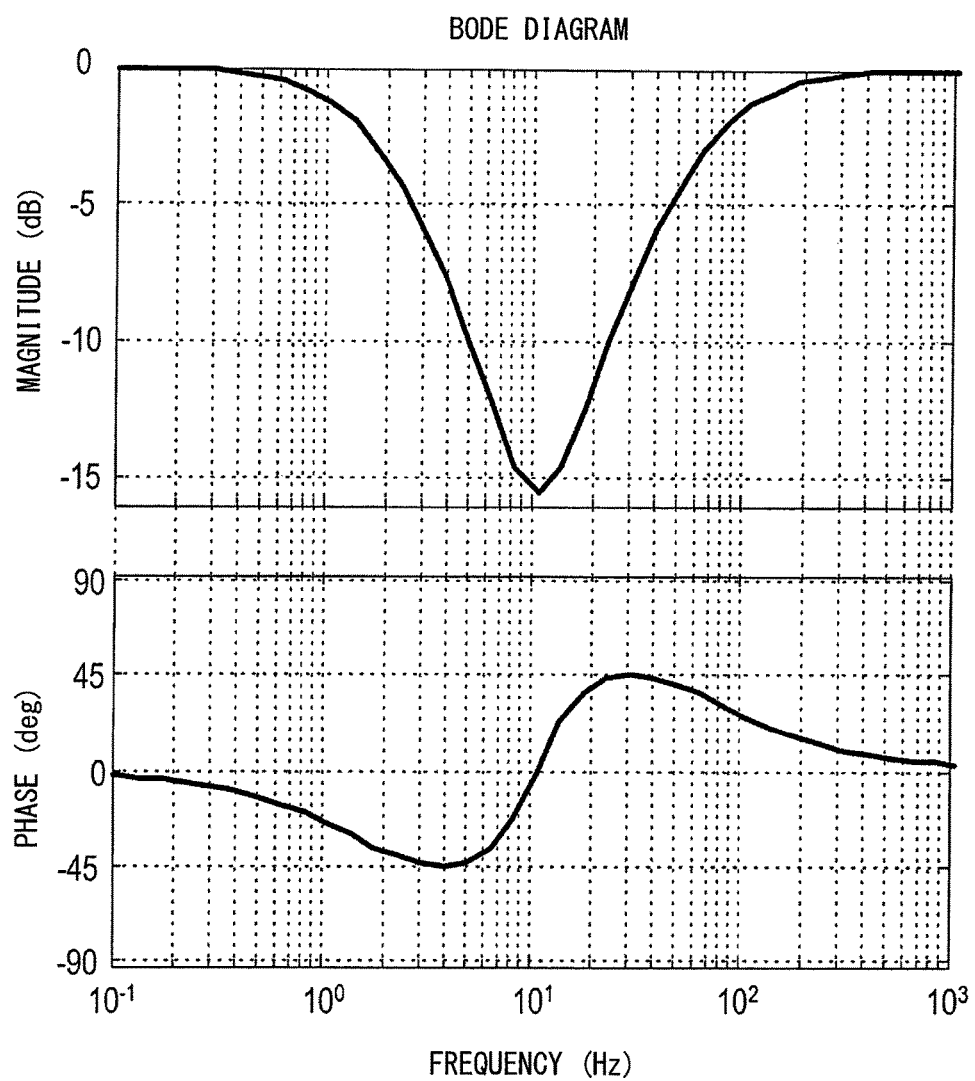
FIG. 8 is a characteristic diagram illustrating a frequency characteristic of a filter.

The filters 251F, 252F, and 253F may have frequency characteristics, for example, as illustrated in FIG. 8. In other words, the filters 251F, 252F, and 253F may be provided by second-order phase compensation filters. Those filters 251F, 252F and 253F are set to be smallest in the gain in the resonant frequency of the control target (steering system mechanism) 100, and have a function of compensating a phase delay at the same time.

In the electric power steering control apparatus according to the second embodiment, in the case where the abnormality of the torque sensor 4 is detected, the abnormality determination unit 40 changes the characteristic of the controller by inserting the filters 251F, 252F, and 253F that are connected in series with the controller compared with a case when the abnormality of the torque sensor 4 is not detected.

According to the electric power steering control apparatus described above, even when the abnormality of the torque sensor 4 is detected, the controller used when no abnormality of the torque sensor 4 is detected can be used.

In addition, in the electric power steering control apparatus, each of the filters 251F, 252F, and 253F is configured as a secondary phase compensation filter for phase compensation.

According to the electric power steering control apparatus 1 described above, since the second-order phase compensation filters 251F, 252F, and 253F are used as the filters 251F, 252F, and 253F for the controller, attenuation at the resonant frequency is increased, and the phase delay can be compensated.

The ECU 15 in the above embodiments corresponds to the electric power steering control apparatus according to the present disclosure. Further, the load estimator 21 and the target generation unit 22 in the above embodiments correspond to a target torque calculation unit in the present disclosure, and the controller unit 24 in the above embodiments corresponds to an assist torque calculation unit in the present disclosure.

Further, the current FB unit 42 in the above embodiments corresponds to a motor drive unit in the present disclosure, and the abnormality determination unit 40 in the above embodiments corresponds to a followability change unit in the present disclosure. Further, the abnormality determination unit 40 and the steering torque calculation unit 45 in the above embodiments correspond to a steering torque calculation unit in the present disclosure.

The electric power steering control apparatus according to the above embodiments of the present disclosure includes the target torque calculation unit, the assist torque calculation unit, the motor drive unit, and the followability change unit. The target torque calculation unit calculates the target torque based on the steering state of the steering wheel, the vehicle, the driver, and the like. The assist torque calculation unit calculates the assist torque for controlling the steering torque close to the target torque according to the deviation between the target torque and the steering torque. The motor drive unit drives the motor, which acts on the steering system mechanism so that the steering system changes the steering angle of the vehicle, according to the assist torque.

In addition, in the case of a configuration in which multiple systems of torque sensors are mounted and an abnormality is detected in one torque sensor, the steering torque calculation unit acquires the steering torque from the signal of the torque sensor which has no abnormality, and controls the assist torque calculation unit to perform calculation with the use of the acquired steering torque. In the case of a configuration in which only one torque sensor is mounted, the steering torque is estimated from another signal without using the signal from the torque sensor, and the assist torque is calculated by the calculation unit with the use of the estimated steering torque. In the case where the abnormality of the torque sensor is detected, the followability change unit degrades the followability of the steering torque to the target torque which is controlled by the assist torque calculation unit compared with the followability in the case where the abnormality of the torque sensor is not detected.

OTHER EMBODIMENTS

The present disclosure is not interpreted with the limit by the above embodiments. Symbols used for description of the above embodiments are also appropriately used in the claims, but used for the purpose of facilitating the understanding of the disclosure according to the respective claims, and are not intended to limit the technical scopes of the disclosure according to the respective claims. In addition, a function of one constituent element in the above-described embodiments may be distributed to a plurality of constituent elements, or functions of a plurality of constituent elements may be integrated into one constituent element. In addition, a portion of the configuration in the above-described embodiment may be omitted so far as the problem can be solved. At least a part of the configuration according to the above-described embodiment may be added to or substituted with another configuration according to the above-described embodiment. In addition, all aspects that are included in the technical spirit that is specified in the attached claims are embodiments of the present disclosure. Incidentally, the definitions of the respective claims can be arbitrarily combined together as much as possible. In this case, a part of the configuration may be excluded.

The present disclosure can be realized in various forms, such as a system which includes the electric steering control apparatus as a component, a program for controlling a computer as the electric steering control apparatus, a medium which stores the control program, or an electric power steering control method, in addition to the electric power steering control apparatus described above.

For example, in the electric power steering control apparatus described above, when the torque sensor 4 has malfunctions, gains assigned by the respective gain assigners 251, 252, and 253 may be changed, or the outputs from the respective gain assigners 251, 252, and 253 may be changed by the filters 251F, 252F, and 253F, to thereby change the followability of the steering torque Ts. Alternatively, the followability of the steering torque Ts may be changed by other methods. For example, the abnormality determination unit 40 may switchably use the controllers different in the control gain according to whether the abnormality of the torque sensor 4 is detected or not.

Figure 9:
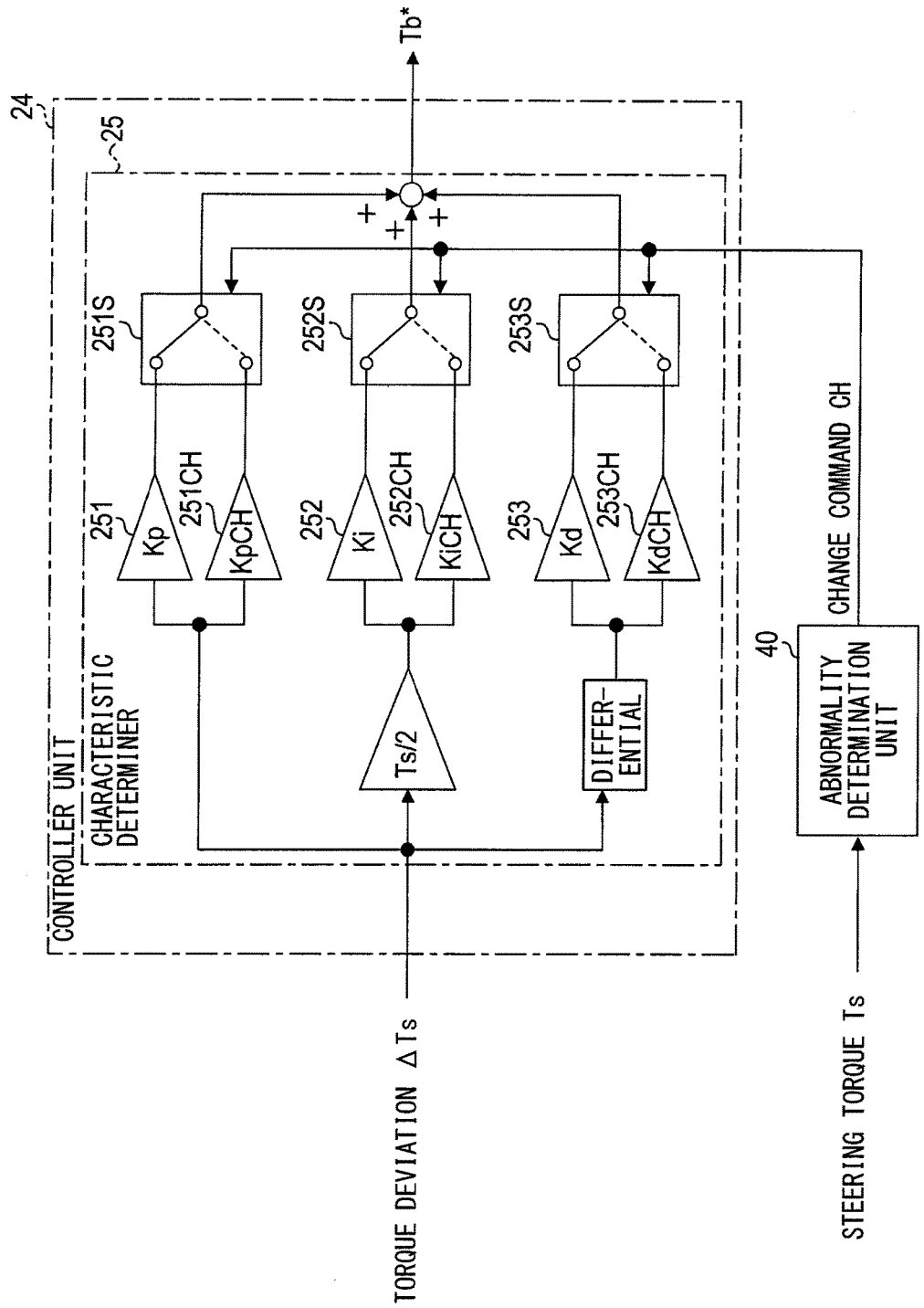
FIG. 9 is a configuration diagram illustrating a schematic configuration of a controller unit according to another embodiment.

Specifically, in the power steering apparatus according to another embodiment, as illustrated in FIG. 9, the characteristic determiner 25 of the controller unit 24 includes abnormality time gain assigners 251CH, 252CH, and 253CH. The abnormality time gain assigners 251CH, 252CH, and 253CH are disposed in parallel to the above-described gain assigners 251, 252, and 253, respectively, and any one of those gain assigners can be selected by the switches 251S, 252S, and 253S.

The abnormality time gain assigners 251CH, 252CH, and 253CH are set to have smaller gains compared with that of the above-described gain assigners 251, 252, and 253, respectively. When there is no abnormality in the torque sensor 4, the abnormality determination unit 40 connects the contact points to the sides where the gain assigners 251, 252, and 253 exist. When the torque sensor is abnormal, the abnormality determination unit 40 connects the contact points to the abnormality purpose use gain assigners 251CH, 252CH, and 253CH.

According to the electric power steering control apparatus in the modification described above, the control gain can be changed by changing the controller to be used.

Figure 10:
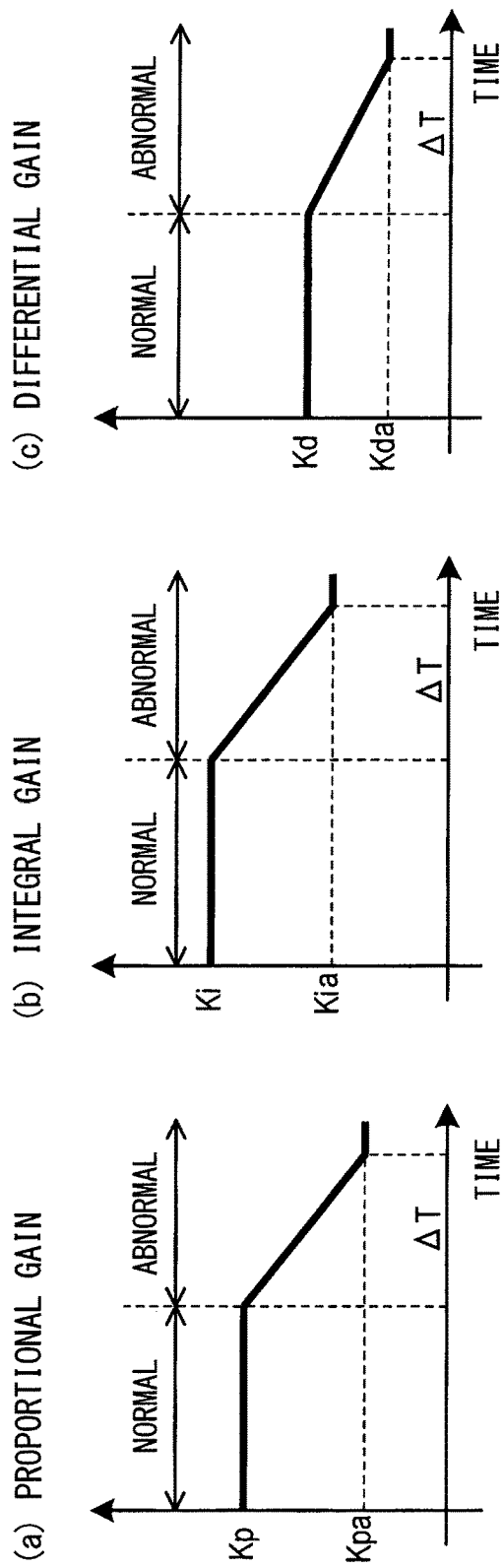
FIG. 10 is a graph illustrating a modification example of a control gain according to another embodiment of the present disclosure.

In the electric power steering control apparatus described above, when the abnormality of the torque sensor 4 is detected, the abnormality determination unit 40 instantaneously changes the control gain from a pre-change gain to the target gain. Alternatively, the abnormality determination unit 40 may gradually change the control gain. Specifically, as illustrated in (a) of FIG. 10, (b) of FIG. 10, and (c) of FIG. 10, when the abnormality of the torque sensor 4 is detected, the abnormality determination unit 40 gradually changes the control gain from the pre-change gain so as to reach the target gain after ΔT seconds.

In the electric power steering control apparatus 1 described above, the control gain is gradually changed. Thus, it is possible to reduce the occurrence of an impact on the steering wheel during the change of the control gain.

The invention claimed is:

1. An electric power steering control apparatus that assists a steering operation made by a driver with a motor, the electric power steering control apparatus comprising:
   a target torque calculation unit configured to calculate a target steering torque;
   an assist torque calculation unit configured to calculate an assist torque which enables an actual steering torque to follow close to the target steering torque, according to a difference between the target steering torque and the actual steering torque;
   a motor drive unit configured to drive a motor which acts on a steering system mechanism so that the steering system mechanism changes a steering angle of a vehicle according to the assist torque; and a followability change unit configured to detect an abnormality of a torque sensor that detects the actual steering torque, wherein, when an abnormality is detected in the torque sensor, the followability change unit degrades a followability of the actual steering torque to the target steering torque controlled by the assist torque calculated in the assist torque calculation unit, compared with a case where no abnormality is detected in the torque sensor.

2. The electric power steering control apparatus according to claim 1, wherein, when the abnormality is detected in the torque sensor, the followability change unit degrades the followability by changing a control gain used by the assist torque calculation unit for calculating the assist torque.

3. The electric power steering control apparatus according to claim 2, wherein, when the abnormality is detected in the torque sensor, the followability change unit gradually changes the control gain from a pre-change gain to a target gain.

4. The electric power steering control apparatus according to claim 2, wherein the followability change unit uses different controllers having different characteristics according to a determination result indicating whether the abnormality is detected in the torque sensor.

5. The electric power steering control apparatus according to claim 2, wherein, when the abnormality of the torque sensor is detected, the followability change unit changes a characteristic of a controller by inserting a filter in series connection with the controller compared with a case where the abnormality of the torque sensor is not detected.

6. The electric power steering control apparatus according to claim 5, wherein the filter is provided by a secondary phase compensation filter having a phase compensation function.

7. The electric power steering control apparatus according to claim 2, wherein a configuration for changing the control gain is provided by a PID controller.

* * * * *